US006542892B1

United States Patent
Cantwell

(10) Patent No.: US 6,542,892 B1
(45) Date of Patent: Apr. 1, 2003

(54) CONFIGURING A CLIENT FOR A PRINTER USING ELECTRONIC MAIL

(75) Inventor: Charles E. Cantwell, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/288,048

(22) Filed: Apr. 7, 1999

(51) Int. Cl.[7] .............................................. G06F 17/00
(52) U.S. Cl. ........................ 707/10; 709/203; 709/320; 358/402; 358/407
(58) Field of Search ..................... 707/1–206; 713/155; 709/223, 200–332; 711/114; 358/400–408

(56) References Cited

2002/0095486 A1 * 7/2002 Bahl ......................... 709/223
2002/0095547 A1 * 7/2002 Watanabe et al. ........... 711/114
2002/0095570 A1 * 7/2002 Eldridge et al. ............ 713/155

OTHER PUBLICATIONS

Hernandez et al., Printers are dangerous, Security Technology, 2001 IEEE 35th International Carnahan Conference on, 2001, pp. 190–196.*

Minoh et al., Networked appliances and their peer–to–peer architecture AMIDEN, IEEE Communications Magazine, vol. 39, Issue 10, Oct. 2001, pp. 80–87.*

Kaplan, simulating Networks, IEEE Spectrum, vol. 38, Issue 1, Jan. 2001, pp. 74–76.*

* cited by examiner

Primary Examiner—David Jung

(57) ABSTRACT

A printer driver is installed on a client computer. The client requests the driver from a print server. The print server identifies a printer served by the print server. The print server retrieves a driver for the printer and a description of the printer's capabilities. The driver and the description are packaged into an electronic mail (e-mail) message and sent to the client. Software installed on the client unpackages the driver and the description from the e-mail and installs the driver on the client. The software also creates a port on the client and attaches the port to the printer driver.

20 Claims, 2 Drawing Sheets

CONFIGURING A CLIENT FOR A PRINTER USING ELECTRONIC MAIL

FIELD OF THE INVENTION

This invention relates in general to configuring a print client for a printer and, more particularly, to a system and method for configuring the client using electronic mail messages.

BACKGROUND OF THE INVENTION

It is often desirable for a print client to send a print job to a printer using the Internet as a path for sending the print job. However, conventional printing methods using the internet fail when trying to pass through a firewall. A firewall does not allow print jobs to pass through.

One method used by the prior art to print through a firewall is to attach the print job to an electronic mail (e-mail) message. The e-mail message and the attached print job are then sent through the firewall. The print job is then detached from the e-mail message and printed.

One problem with using the e-mail method is that the print client often does not know anything about the printer to which the job will be sent. In addition, the client has no means of readily discovering information about the printer. Thus, the client cannot easily determine the capabilities of the printer or which driver should be used for the printer. Additionally, even if the client could determine the appropriate driver, the client may be in a remote location without access to the correct driver for the printer.

SUMMARY OF THE INVENTION

According to principles of the present invention, a printer driver is installed on a client computer. The client requests the driver from a print server. The print server identifies a printer served by the print server. The print server retrieves a driver for the printer and a description of the printer's capabilities. The driver and the description are packaged into an electronic mail (e-mail) message and sent to the client. Software installed on the client unpackages the driver and the description from the e-mail and installs the driver on the client. The software also creates a port on the client and attaches the port to the printer driver.

According to further principles of the present invention, the print server determines a user of the client and compares the user to a list of allowed users. If one of the users on the list of allowed users matches the user of the client, the print server provides the print driver to the client. If there is no match, the print server does not provide the driver to the client.

A printer may be setup on the client machine by simply entering the destination e-mail address of the printer in the client software. A series of e-mail messages are traded between the print client software and the print server, which automatically sets up the printer on the client machine. At no point does the user need to know anything about the printer except its e-mail address.

Other objects, advantages, and capabilities of the present invention will become more apparent as the description proceeds.

DETAILED DESCRIPTION OF THE INVENTION

Figure 1:
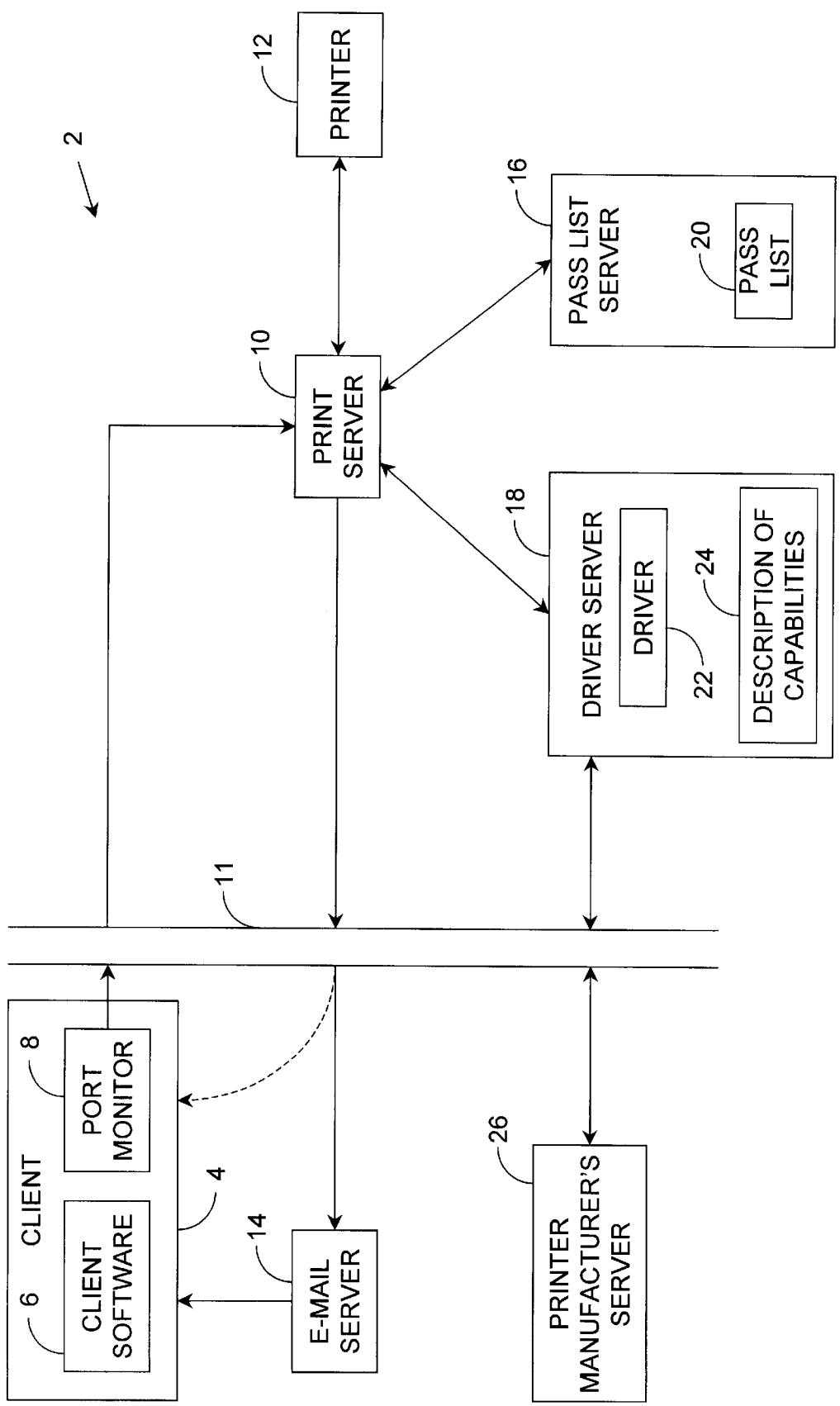
FIG. 1 is a block diagram illustrating components of the present invention.

FIG. 1 illustrates a system 2 for using the electronic mail (e-mail) to transport a print driver to a client 4. Client 4 is a computer or other device that uses printers for print jobs. Client software 6 is installed on client 4. Client software 6 is responsible for printer configuration, printer setup, and print utilities. Port monitor 8 is also installed on client 6. Port monitor 8 intercepts print jobs from client 6 and packages them in an electronic mail (e-mail) message then sends them to a print server 10. Print server 10 may be separated from client 4 by firewall 11. Although the present invention solves some of the difficulties created by firewall 11, print server 10 and client 4 need not be separated by firewall 11 to practice the present invention. System 2 may be connected by an intranet or an internet.

Print server 10 is either embedded in printer 12 or a computer that communicates with printer 12. Print server 10 is the main junction for system 2. Besides port monitor 8 and printer 12, print server 10 also communicates with a pass list server 16 and a driver server 18.

Print server 10 communicates with port monitor 8 by exchanging e-mail messages. If necessary or desirable, e-mail messages sent to port monitor 8 first pass through an e-mail server 14. From e-mail server 14, the e-mail messages are passed to client 6 and then to port monitor 8.

Pass list server 16 contains a pass list 20 of individuals or groups of individuals that are authorized to use printer 12. The individuals and groups authorized to use printer 12 will be referred to as the allowed users. If print server 10 has the capabilities to do so, pass list 20 may be stored on print server 10. Alternatively, pass list server 16 is a computer that communicates with print server 10. Optionally, pass list server 4 also includes software for tracking print jobs, load balancing, billing, resource ordering, and other desirable functions.

Driver server 18 is responsible for maintaining printer drivers 22 for printer 12. Drivers 22 are necessary for client 6 to format its print jobs properly for printer 12. Driver server 18 maintains a mapping between the printer model name and the appropriate driver 22 for the appropriate client operating systems. Driver server 18 may also contain default drivers for unknown printers.

A driver server auto-update mechanism 24 is responsible for communicating with a printer manufacturer's server 26 which contains the latest drivers for printer 12. Mechanism 24 updates driver server 18 automatically with the latest drivers available from the manufacturer. Optionally, mechanism 24 may also receive e-mail notifications from the printer manufacturer that allow mechanism 24 to retrieve the latest drivers.

Figure 2:
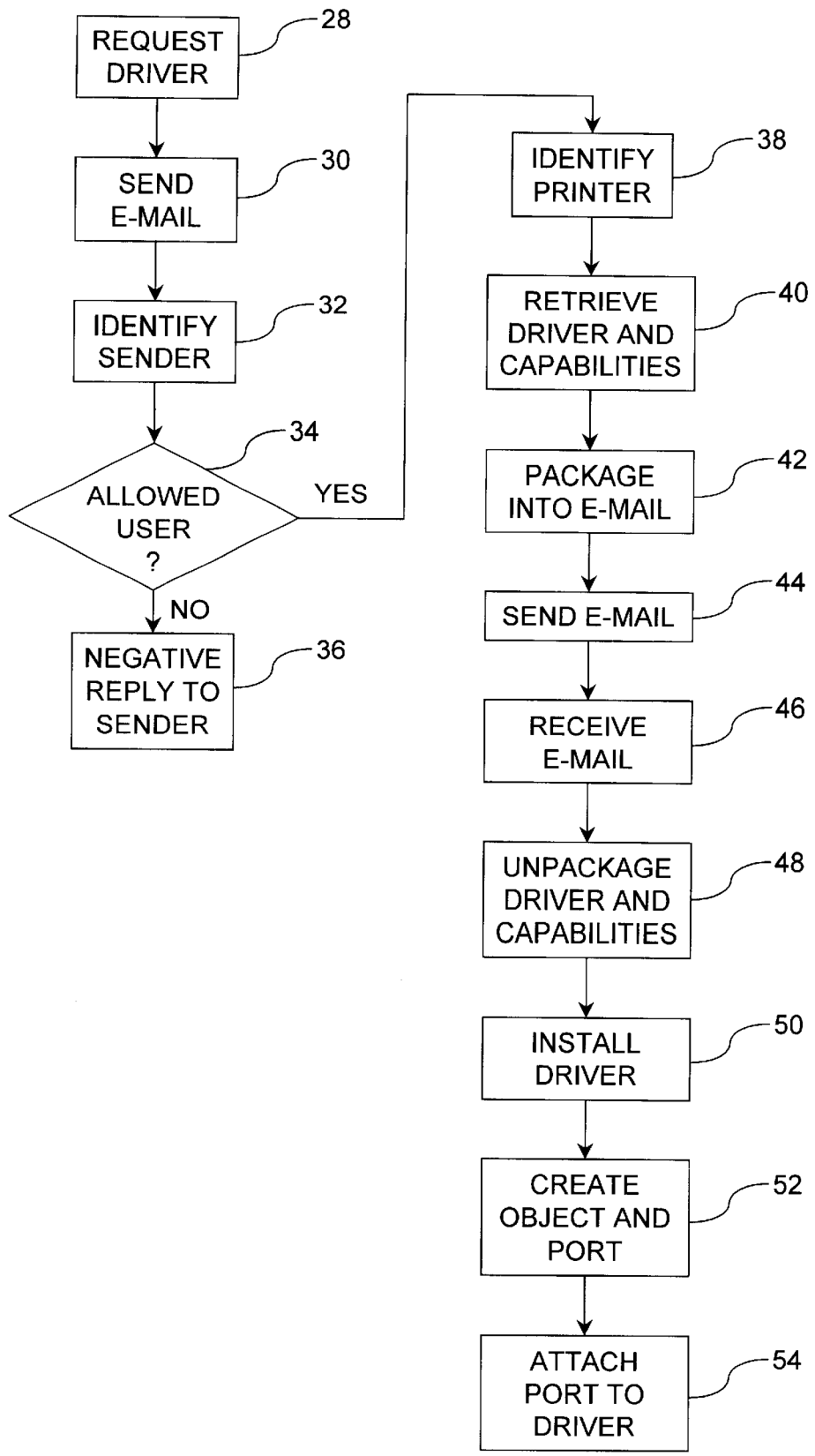
FIG. 2 is a flow chart illustrating one method for installing a print driver on a client.

FIG. 2 illustrates how the system components act together to install a driver 22 on client 4 using e-mail. First, a driver is requested. The driver may be requested by the client or someone else on the client's behalf. Alternatively, the request step may be omitted, such as in the case of an automatic driver installation to a known user.

In one embodiment, the driver is requested by a user of client 4 running client software 6 and selecting "Printer Installation". The user is then prompted for an e-mail address of printer 12. Client software 6 then sends 30 an e-mail to the print server 10 asking it for a description of the capabilities of printer 10 and a driver file 22. The e-mail contains information about the operating system and preferences of client 4. Optionally, the e-mail is encrypted and digitally signed.

Print server 10 identifies 32 the sender of the e-mail, checks the digital signature and decrypts the e-mail. The sender is checked 34 against a pass list 20 either on the print server 10 or against a list 20 on the pass-list server 16. If the sender is not an allowed user, the e-mail is discarded. Optionally, print server 10 sends 36 a negation reply e-mail to the user. Comparing the sender of the request e-mail to a pass list is an optional step and may be bypassed in systems where such security measures are unnecessary or undesirable.

If the sender is an allowed user, the print server 10 identifies 38 the printer 12 attached to it. The identity of the printer 12 may be hard-coded for some print servers. Print server 10 then retrieves 40 the proper printer driver 22 from the driver server 18. This driver 22 and the description of the capabilities of the printer 12 are packaged 42 into an e-mail and sent 44 back to client 4.

Client software 6 receives 46 the e-mail and unpackages 48 driver 22 and the description from the e-mail. Client software 6 then installs 50 driver 22 on client 4. Next, client software 6 creates 52 a printer object and a print port on client 4 and attaches 54 the print port to driver 22. Client 6 is then ready to print to printer 12.

Driver auto-update mechanism 24 runs in the background on driver server 18. Mechanism 24 communicates with printer manufacturer's server 26 directly and retrieves driver updates and new drivers. The communications with the printer manufacturer takes place with e-mail. Auto-update mechanism 24 may be configured to poll manufacturer's server 26 or register itself with the manufacturer to receive e-mail updates automatically. When auto-update mechanism 24 receives a new driver 22, it sets it up in either a database or a known directory structure format. If it is a new driver, an entry is made in its internal mapping list that correlates printer models to the drivers.

Before beginning the steps illustrated in FIG. 2, print server 10 should exist either as software on a computer that communicates to a printer 12, or embedded into printer 12 directly; port monitor 8 and client software 6 should already be installed on client 4; and if desired, pass list server 16 and driver server 18 should already be setup and configured.

Since system 2 identifies printer 12 and sends the correct driver 22 to the user, the user does not need to know which driver 22 is required for printer 12, or even the make and model of printer 12. Also, since client software 6 installs driver 22, the user does not need to setup the printer driver manually.

Additionally, the user does not need to know who administers printer 12. Administrators can create pass lists 20 of allowed users to avoid unauthorized use of printer 12. Administrators may also optionally setup additional software on the passlist server to do billing, load balancing, resource ordering, and other tasks.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for installing a printer driver on a client, the method comprising:

(a) requesting a printer driver;
   (b) the print server identifying a printer served by the print server;
   (c) retrieving the printer driver for the printer;
   (d) packaging the printer driver into a reply electronic mail message;
   (e) sending the reply electronic mail message to the client;
   (f) unpackaging the driver from the reply electronic mail message; and,
   (g) installing the driver on the client.

2. The method of claim 1 wherein requesting the printer driver includes the client requesting the printer driver.

3. The method of claim 1 wherein requesting the print driver includes:

(a) packaging a request into a request electronic mail message;
   (b) sending the request electronic mail message to the print server;
   (c) the print server receiving the request electronic mail message; and,
   (d) the print server unpackaging the request from the request electronic mail message.

4. The method of claim 1 further including:

(b) identifying an electronic mail address of the client;
   (c) sending the reply electronic mail message to the electronic mail address.

5. The method of claim 1 further including:

(a) creating a print port on the client; and,
   (b) attaching the print port to the printer driver.

6. The method of claim 1 further including:

(a) identifying a user of the client; and,
   (b) comparing the user to a list of allowed users.

7. The method of claim 6 wherein identifying a user of the client includes identifying an electronic mail address of the user.

8. The method of claim 1 further including:

(a) retrieving a description of the capabilities of the printer;
   (b) packaging the description into the reply electronic mail message; and,
   (c) unpackaging the description from the reply electronic mail message.

9. A system for installing a printer driver on a client, the system comprising:

(a) means for requesting a printer driver;
   (b) a print server having means for identifying a printer served by the print server;
   (c) means for retrieving the printer driver for the printer;
   (d) means for packaging the printer driver into a reply electronic mail message;
   (e) means for sending the reply electronic mail message to the client;
   (f) means for unpackaging the driver from the reply electronic mail message; and,
   (g) means for installing the driver on the client.

10. The system of claim 9 wherein the means for requesting the print driver includes:

(a) means for packaging a request into a request electronic mail message;
   (b) means for sending the request electronic mail message to the print server;
   (c) the print server having means for receiving the request electronic mail message; and, (d) the print server having means for unpackaging the request from the request electronic mail message.

11. The system of claim 9 further including:

(b) means for identifying an electronic mail address of the client;

(c) means for sending the reply electronic mail message to the electronic mail address.

12. The system of claim 9 further including:

(a) means for creating a print port on the client; and, (b) means for attaching the print port to the printer driver.

13. The system of claim 9 further including:

(a) means for identifying a user of the client; and, (b) means for comparing the user to a list of allowed users.

14. The system of claim 13 wherein the means for identifying a user of the client includes means for identifying an electronic mail address of the user.

15. The system of claim 9 further including:

(a) means for retrieving a description of the capabilities of the printer;

(b) means for packaging the description into the reply electronic mail message; and, (c) means for unpackaging the description from the reply electronic mail message.

16. A method for installing a printer driver on a client, the method comprising:

(a) identifying the client;

(b) identifying a driver for the printer;

(c) packaging the driver into an electronic mail message;

(d) sending the electronic mail message to the client;

(e) the client unpackaging the driver from the electronic mail message; and, (f) the client installing the printer driver on the client.

17. The method of claim 16 further including the client requesting the driver for the printer.

18. The method of claim 16 further including:

(a) creating a print port on the client; and, (b) attaching the print port to the printer driver.

19. The method of claim 16 further including retrieving the driver from a manufacturer of the printer.

20. The method of claim 16 further including:

(a) retrieving a description of the capabilities of the printer;

(b) packaging the description into the electronic mail message; and, (c) unpackaging the description from the electronic mail message.

\* \* \* \* \*